United States Patent [19]
Yeh et al.

[11] Patent Number: 5,177,791
[45] Date of Patent: Jan. 5, 1993

[54] SECURE TRANSLATION OF USAGE-CONTROL VALUES FOR CRYPTOGRAPHIC KEYS

[75] Inventors: Phil C. Yeh, Poughkeepsie, N.Y.; Dennis G. Abraham, Concord, N.C.; Donald B. Johnson, Manassas, Va.; An Van Le, Manassas, Va.; Stephen M. Matyas, Manassas, Va.; Rotislaw Prymak, Dumfries, Va.; Ronald M. Smith, Sr., Wappingers Falls, N.Y.; John D. Wilkins, Somerville, Va.

[73] Assignee: International Business Machines Corp., Armonk, N.Y.

[21] Appl. No.: 753,245

[22] Filed: Aug. 30, 1991

[51] Int. Cl.⁵ .............................................. H04L 9/32
[52] U.S. Cl. ....................................... 380/45; 380/21; 380/25
[58] Field of Search ............................ 380/25, 45, 21

[56] References Cited

U.S. PATENT DOCUMENTS 5,081,677 6/1992 Green et al. .......................... 380/21
5,103,478 4/1992 Matyas et al. ........................ 380/25

*Primary Examiner*—Salvatore Cangialosi
*Attorney, Agent, or Firm*—William B. Porter

[57] ABSTRACT

A working key of a certain key type is to be transmitted from a first system (having a first usage-control value associated with keys of the certain type) and a second system (having a second usage-control value associated with keys of the certain type). A translation control value, associated with the certain key type, is generated, functionally relating the first and second usage-control values. The translation control value is used in a cryptographic function to send or receive the working key between systems, the cryptographic function being designed to produce valid results when the correct translation control value, and usage-control values, are employed, and unpredictable results otherwise. Effectively, the first usage-control value is translated to the second usage-control value.

23 Claims, 8 Drawing Sheets

PRIOR ART FIG. 6

SECURE TRANSLATION OF USAGE-CONTROL VALUES FOR CRYPTOGRAPHIC KEYS

BACKGROUND OF THE INVENTION

1. Field of the Invention

This invention relates to computers and computer system complexes capable of performing cryptographic operations. More particularly, this invention describes a secure mechanism for translating usage-control values for cryptographic keys, for example - to exchange the keys between systems which use incompatible key usage-control values for enforcing key separation.

2. Background Art

In computer-based cryptographic systems known in the prior art, it is conventional to employ key-encrypting-keys (KEKs) to encipher other keys. To enforce "key separation" (i.e., to ensure that a key is used for a particular purpose (e.g., enciphering other keys) and not for another purpose (e.g., enciphering data)), a permutation of the KEK is known to be used for, and associated with, a particular key usage (or key type). Termed a KEK "variant" in some systems (when a fixed variant constant is Exclusive ORed with the KEK to produce the KEK permutation), or a KEK derivative in control vector based systems (when the value used in the Exclusive ORing process is a meaning-significant bit pattern), the process of applying and unapplying the necessary KEK permutations is a simple one when a single permutation scheme is used on one system, or across systems. In this case, there is one set of variant constants, or one set of control vectors. However, if communicating systems use different sets of variant constants and/or control vectors to enforce key separation, then applying and unapplying the permutations is a more complex process.

In the subsequent discussion, the term "usage-control value" is used to mean either a variant constant or a control vector, or an equivalent parameter. Also, the term "KEK derivative" or "derivative of the KEK" is used to mean the result of Exclusive ORing the KEK with a usage-control value.

One method for dealing with this problem is to install a shared KEK between the two systems, where the value of the KEK installed in one of the systems is adjusted to compensate for the difference between the usage-control values used in the two systems. This method adds complexity to the key installation process and increases the number of keys which must be installed since a different key must be installed for each type of key to be transmitted between the two systems.

Another mechanism for dealing with this problem is described in U.S. Pat. No. 4,993,069, "Secure Key Management Using Control Vector Translation", by Matyas et al., dated Feb. 12, 1991, and assigned to the same assignee as the present invention. The mechanism described in that patent was designed for a control vector based system to accommodate key exchanges with systems using incompatible control vectors, and (in keeping with the philosophy of control vector systems, where the bit positions in the constant carry significance) that mechanism entailed "control vector checking" function to assure security. The description of key separation using control vectors is generally described in U.S. Pat. No. 4,941,176, "Secure Management of Keys Using Control Vectors", by Matyas, et al., dated Jul. 10, 1990, and assigned to the assignee of the present invention. It is incorporated herein by reference.

It is an object of the present invention to provide for secure key exchange between systems with incompatible usage-control mechanisms—be those mechanisms control vector schemes, or key-encrypting key variant schemes.

Another object of this invention is to provide for secure translation of a key type between one usage-control value and another usage-control value on the same system.

It is a further object of this invention to improve usability of the interface that allows the security administrator to specify translation control information.

It is a further object of this invention to provide for secure key exchange between systems with incompatible usage-control mechanisms with minimal complexity. This includes removal of extensive checking, redundancy of translation control information, and additional key types required in the prior art.

It is still a further object of this invention to provide for secure key exchange between systems with incompatible usage-control mechanisms, with only minor modifications to known functions. The functions provided for conversion of key types are patterned closely after known functions for translation of PIN's, cipher text, and keys.

SUMMARY OF THE INVENTION

This invention provides a mechanism for securely translating usage-control values for cryptographic keys —for example, to transmit one such key (enciphered under a derivative of a shared key-encrypting key) between two systems which use incompatible schemes to enforce key separation.

The mechanism creates a set of two "dummy keys" which it uses in its processing for each key type to be either sent to or received from another system (i.e., it requires 2N dummy keys at a system to receive keys of N different key types from another system). In operation, existing cryptographic operations may be used to perform the individual steps required for the translation process.

DESCRIPTION OF THE PREFERRED EMBODIMENT

The following definitions are used in the subsequent discussion.

Key Types

Two key types are described below for subsequent discussion:

1. Exporter: This key is used to protect keys of any type which are sent from this system to another system.
2. Importer: This key is used to protect keys of any type which are sent from another system to this system.

Two systems must share a common key for exchanging keys; the key is an importer at the receiver and is an exporter at the originator.

Notations

The following summarizes the notations used in the subsequent discussion.

| Notation | Description |
| --- | --- |
| V | a usage-control value which may not be a valid control vector supported by this system. |
| CVi | the ith control vector. |
| im | the control vector for an importer. |
| ex | the control vector for an exporter. |
| t1 | the control vector for an unspecified key type, T1. |
| t2 | the control vector for an unspecified key type, T2. |
| + | Exclusive OR. |
| K | a cryptographic key. |
| K.CVi | K + CVi. |
| MK | Master key. |
| eK(x) | Encipherment of x using key K. |
| dK(x) | Decipherment of x using key K. |
| eKEK.CVi(K) | Encipherment of K using KEK.CVi. |
| dKEK.CVi(K) | Decipherment of K using KEK.CVi. |

Figure 1:
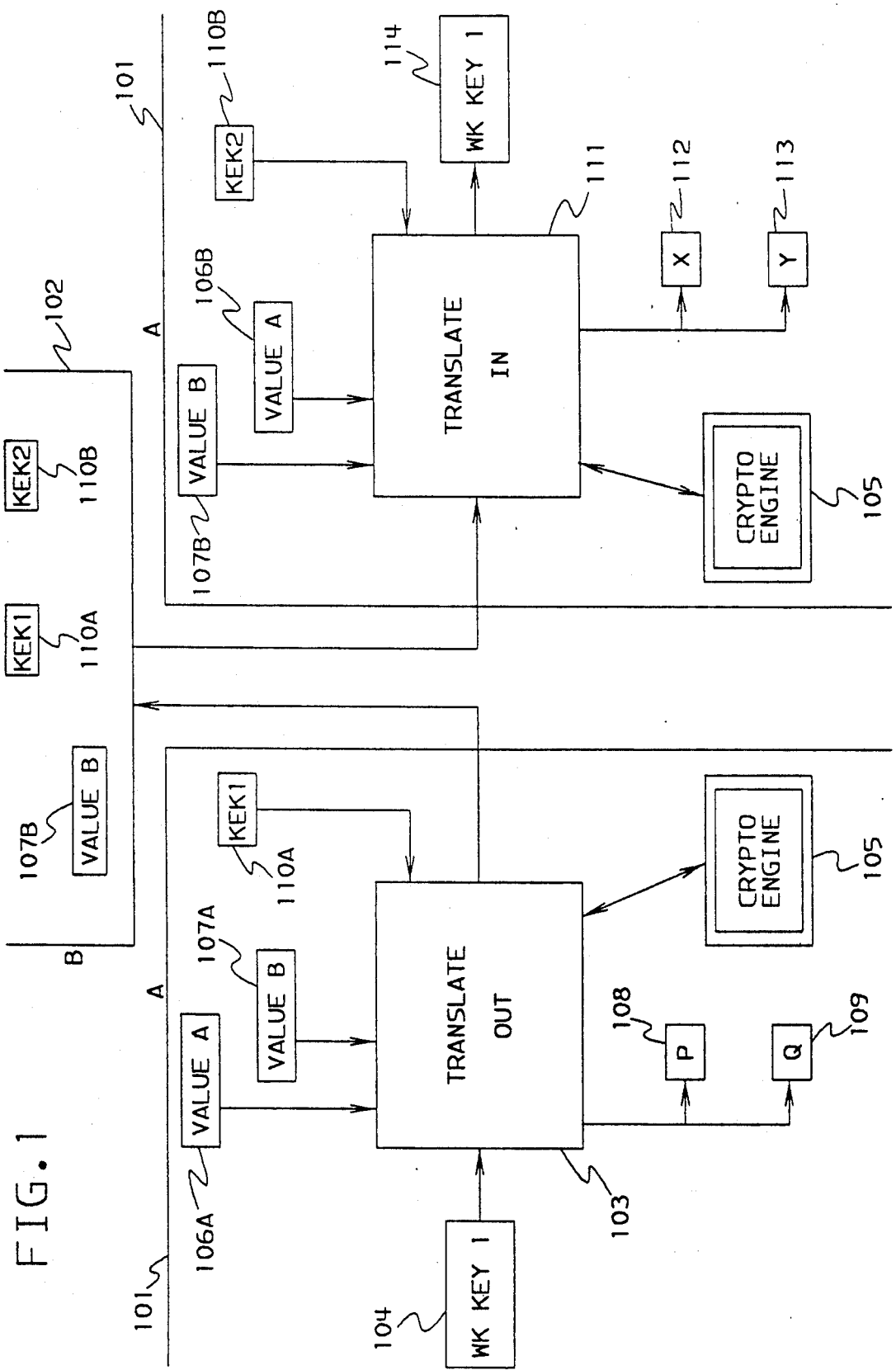
FIG. 1 is a block diagram illustrating the functional environment of the present invention.

FIG. 1 shows, in block diagram form, an overview of the operation of the present invention. System A (101) uses shared key-encrypting-key KEK1 (110A) and KEK2 (110B) for transmitting working keys to and receiving from System B (102). Usage-control value A (106A) is used to enforce key separation at System A for working keys of type T; usage-control value B (107B) is used for key type T at System B. When System A desires to transmit working key 1 (104) (a key of type T) to System B, it uses a translate out process (103) to secure working key 1 for transmission. Translate out process 103 takes as input working key 1 (104), usage-control value A (106A), usage-control value B (107A), and shared KEK1 (110A). Process 103 interacts with cryptographic engine 105, creates two dummy keys P (108) and Q (109), and sends the necessary data securely to system B. When system A desires to receive a key of type T from system B, system A uses a translate in process (111) to receive working key 1 (115) in a form it can deal with. Process 111 takes as input usage-control value B (107B), usage-control A (106A), and shared key-encrypting-key KEK2 (110B). It interacts with cryptographic engine 105, creates two dummy keys X (112) and Y (113), and produces working key 1 in usable form (114).

Figure 2:
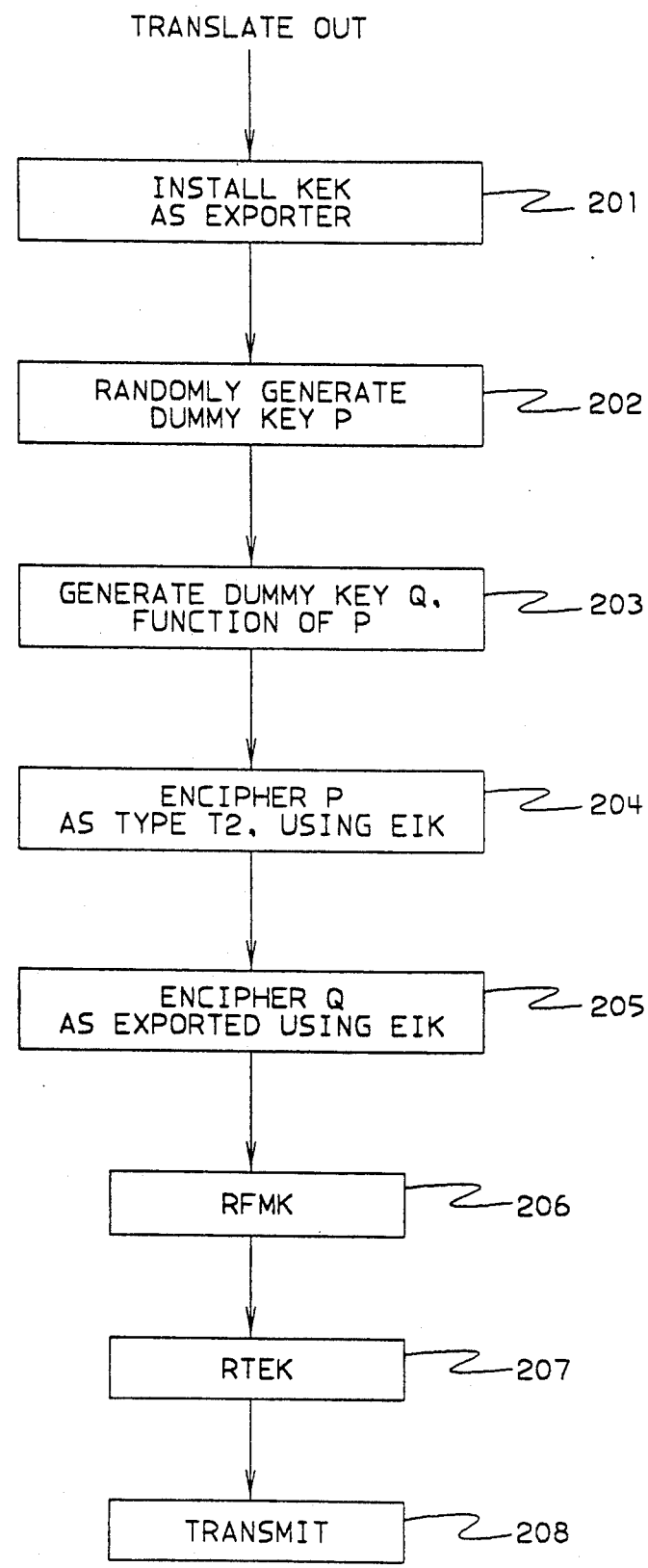
FIG. 2 is a flowchart illustrating the translate-out control flow.

FIG. 2 illustrates control flow for the translate-out process. The process is used to export a key and also change the key type from the one specified by $CV_i$ to the one specified by V. Steps 201 to 205 create two dummy keys, and establish the operating environment. At 201, a shared KEK is installed as an exporter at the sending system. This means that the KEK is encrypted as eMK.ex(KEK). At 202, a random number is generated (the method of generation is not important for understanding of this invention, and can be any of numerous techniques known in the art) to form a dummy key, P. Next, 203, the second dummy key Q is generated as $$Q = P + V + CV_i$$

where "+" indicates an Exclusive OR operation.

Figure 8:
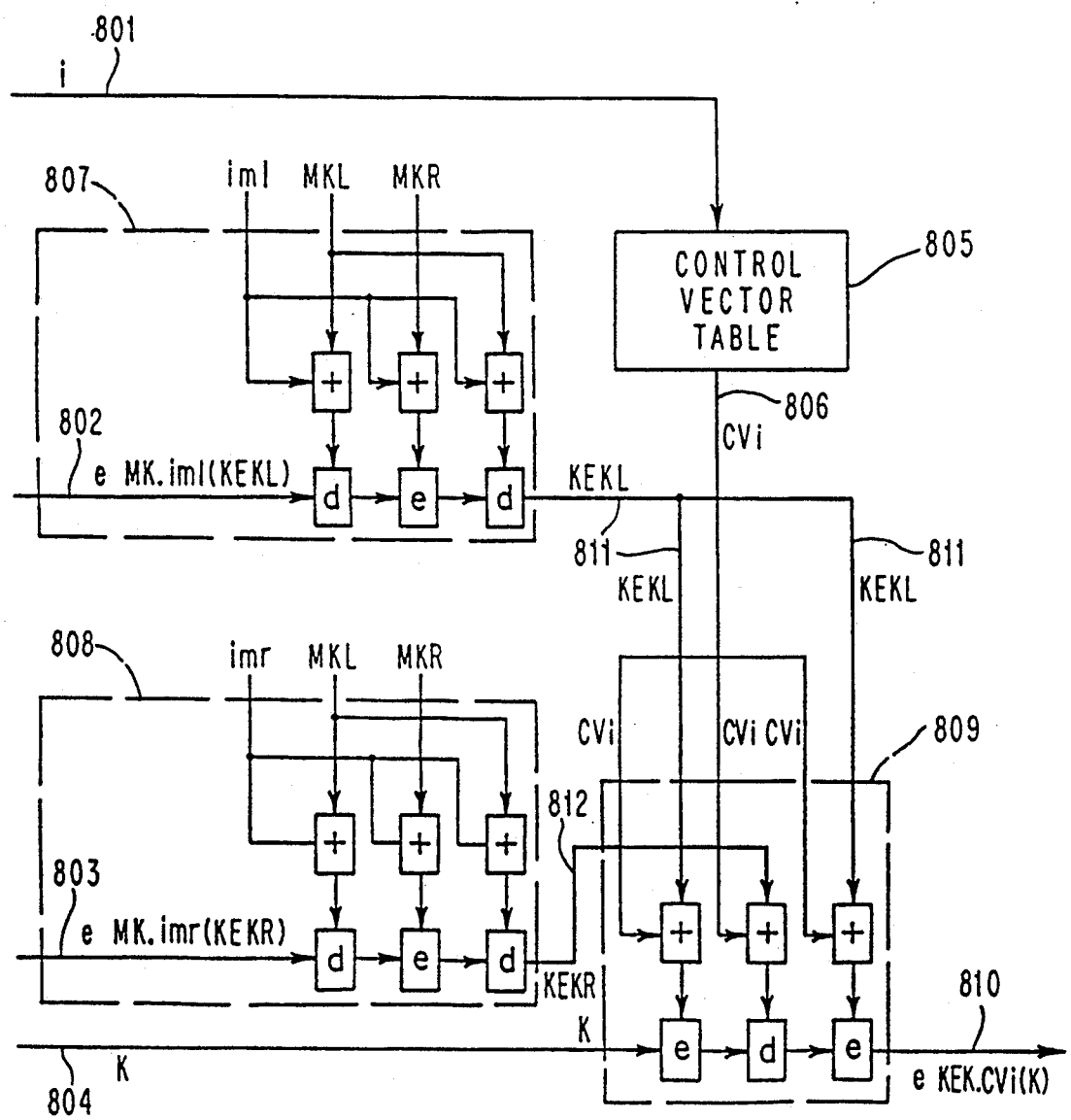
FIG. 8 is a block diagram illustrating the EIK instruction (known in the prior art).

At 204, P is encrypted as a key of type T2 using the EIK function (known to the prior art). This function can only be executed in a special mode for security (see U.S. patent application, Ser. No. 07/672,265, by R. M. Smith Sr., et al., filed 3/20/91, assigned to the assignee of the present invention and incorporated herein by reference). This mode can be enabled or disabled by means of a manual key switch. (FIG. 8 illustrates the EIK function in detail.) As a result of this instruction, P is encrypted as: eMK.t2(P). At 205, Q is encrypted as an exporter using the EIK function. That is, Q is encrypted as: eMK.ex(Q). Dummy keys can only be installed in the special-security mode. High security is obtained by disabling the mode during normal operation so that no program can create dummy keys for unintended translations. Once the dummy keys are installed by means of the EIK function, they are stored in program accessible storage and protected by the operating system. Instead of using the encipher under importer key function, installation of dummy keys could also be performed by means of manual key entry, which is described in the aforementioned patent application, Ser. No. 07/672,265, entitled "Method and Apparatus for Validating Entry of Cryptographic Keys".

Having created the two dummy keys, and established the operating environment, a working key in the form of $eMK.eV_i(K)$ can be exported securely by steps 206-208. At 206, RFMK is executed using as input i, eMK.ex(Q), and $eMK.CV_i(K)$. RFMK is known in the prior art, and is explained in greater detail in FIG. 7. The result of executing this operation is $eQ.CV_i(K)$. However, since $Q = P + V + CV_i$, therefore $Q.CV_i = Q + CV_i = P + V = P.V$. Thus, the result can be written equivalently as eP.V(K). Next, 207, the result of 206 is input to an RTEK operation (with V, eMK.t2(P), and eMK.ex(KEK)). The RTEK operation is explained in greater detail in FIG. 5. The result of this RTEK is eKEK.V(K), which is the value exported to the other system 208.

Figure 3:
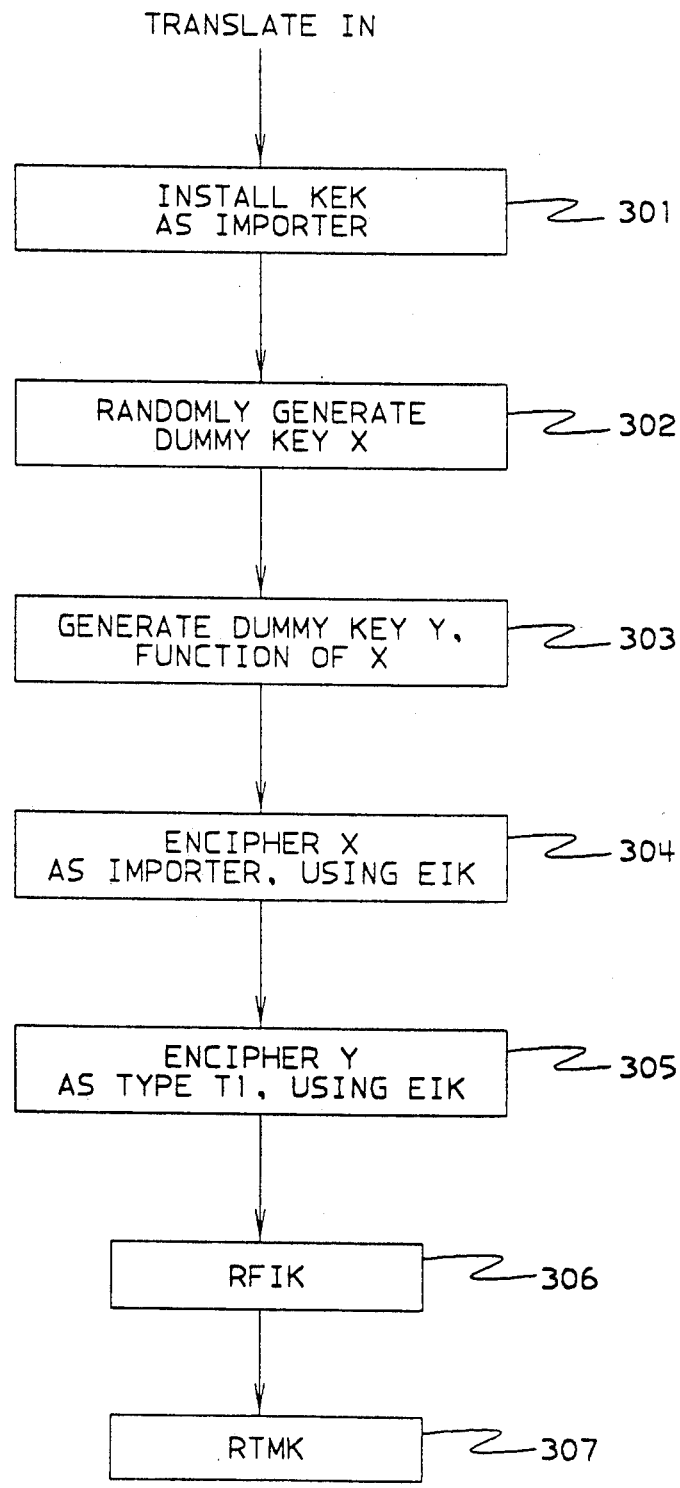
FIG. 3 is a flowchart illustrating the translate-in control flow.

FIG. 3 illustrates control flow for the translate-in process. The process is used to import a key, and also change the key type from the one specified by V to the one specified by $CV_i$. Steps 301 to 305 create two dummy keys, and establish the operating environment. At 301, the shared KEK is installed as an importer at the receiving system. This means that the KEK is encrypted as eMK.im(KEK). At 302, a random number is generated (again, means of generation not important for the invention) to form a dummy key, X. Next, 303, the second dummy key Y is generated as:

$$Y = X + V + CV_i$$

(again, "+" means "Exclusive OR").

At 304, X is encrypted as an importer key using the EIK function (in the special mode). (FIG. 8 shows detail for the EIK function.) As a result of this instruction, X is encrypted as: eMK.im(X). At 305, Y is encrypted as a key of type T1 using EIK. That is, Y is encrypted as: eMK.t1(Y). Dummy keys can only be installed in the special-security mode. High security is obtained by disabling the mode during normal operation so that no program can create dummy keys for unintended translations. Once the dummy keys are installed by means of the EIK function, they are stored in program accessible storage and protected by the operating system.

Having created the two dummy keys, a working key in the form eKEK.V(K) key can be imported securely as shown in steps 306-307: at 306, RFIK is executed using as input V,eMK.im(KEK), eMK.t1(Y), and eKEK.V(K). RFIK is shown in greater detail in FIG. 4. The result of executing this operation is eY.V(K). However, since $Y = X + V + CV_i$, therefore $Y.V = Y + V = X + CV_i$. Thus the result can be written equivalently as $eX.CV_i(K)$. Next, 307, the result of 306 is input to an RTMK operation (along with i and eMK.im(X)). The RTMK operation (known in the prior art) is explained in greater detail in FIG. 6. The result of this RTMK operation is $eMK.CV_i(K)$, which is the working key in usable form on the receiving system. In the preferred embodiment of the present invention, key type $t_1$ is an exporter and key type $t_2$ is an importer. Thus, RFIK and RTEK become identical to a translate-key function.

Note that the translation of the usage-control value of the working key from CVi to V (or from V to CVi) is controlled by the two coupled dummy keys Q and P (or X and Y), which are in the encrypted form. Although the dummy key P (or X) is simply a random number, the dummy key Q (or Y) must have a specific relationship with P (or X) in order to successfully perform the intended translation. If a malicious program replaces one of the coupled dummy keys with a unrelated dummy key or an arbitrary number, or replaces both coupled dummy keys with unrelated dummy keys or arbitrary numbers, in an attempt to create an undesirable translation, the process will produce an unpredictable result because of the novel mechanism of coupling the dummy keys. The space of possible results is so large that the chance of producing a meaningful result is comparable to the chance of arbitrarily guessing a DES key. This novel mechanism of controlling translation allows high security to be achieved without the complex checking on control vectors and masking vectors required in the prior art (see, e.g., the aforementioned U.S. Pat. No. 4,993,069). Also, this coupling of the dummy keys eliminates the need to store them in two different forms, as required in that prior art, so that further reduction in implementation complexity is achieved. Furthermore, the two coupled dummy keys are encrypted as exporter and importer keys; that is key type tl is an exporter and key type t2 is an importer. There is no new key type required. The prior art requires two new key types and, thus, requires additional complexity in key management. Additionally, the process of generating dummy keys in this invention is much simpler than the process of generating masking vectors in the prior art, and can be efficiently automated. This is because the usage-control value is treated as a constant, which can be referred to by a name, in this invention while, in the prior art, the usage-control value is bit-significant and each bit must be explicitly named and separately specified by the user.

It should be noted that while the control flow depicted in FIG. 2 (or FIG. 3)is sequential, it is not necessary that all operations be performed in the described order or that all instances of a translate out (or translate in) operation require all the described steps. Steps 202 to 205 (or 302 to 305) may be executed only once at system initialization. Step 201 or (301) will be executed only as often as a new key-encrypting-key is installed. Steps 206 and 207 (or 306 and 307) are executed each time a key is translated. Step 208, the transmission of the key to another system, may consist of an actual transfer across communication lines, may be accomplished by means of a shared direct access device, or in some cases, the translated key may be used by the current system. Similarly, the key used as the input to translate in may have been created by another system and transmitted to this one, or the key may have originated at this system.

It should also be noted that an alternative embodiment for the installation of the dummy keys is to manually install these values by means of a manual key input device.

It will be obvious to one skilled in the state of the art that the RFMK and RTMK functions shown in FIG. 2 can be combined into a single function. Similarly, the RFIK and RTMK functions shown in figure 3 can be combined into a single function. Furthermore, the information supplied to such a function can be in a form other than a pair of dummy keys. For example, the information could be an encrypted form of the two usage-control values. Thus, in such an implementation, the installation of dummy keys becomes the installation of this information, sometimes called a translation control value.

In most systems, translation is required for several types of keys. Each such translation requires a translation control value consisting of a pair of dummy keys. The translation control values would normally be generated by a software utility invoked during system initialization. This setup utility would generate a pair of values for each desired mapping. The information would be placed in a table which could have the following form:

id1 (DKa1, DKb2)
id2 (DKa2, DKb2)
...
idn (DKan, DKbn)

Where id1, id2, etc. are indexes to the table and are used to select the correct entry to be used for a specific translation. DKal and DKbl, DKa2 and DKb2, etc., are the encrypted dummy key pairs. The pair DKla, DKlb would allow translation from Usage-Control Value-1 to Usage-Control Value -2, and so forth. A Usage-Control Value can be a Control Vector, Variant, or other mask value.

Note that if each entry is based on a different the others. If the same random number is used for some subset, then this forms classes of allowed translations. This table would be access controlled to ensure only the translation service would use it for its intended purpose. An alternate embodiment could be employed in a large computing system that has a very reliable software access control mechanism. In this case, the setup utility would create all possible mapping pairs in advance and store them in a table. The access control mechanism is then the gate as to whether someone is allowed to map a UCV from one value to another. This alternate embodiment allows initialization to proceed transparently to the user, as no choices need be made at initialization time.

Figure 4:
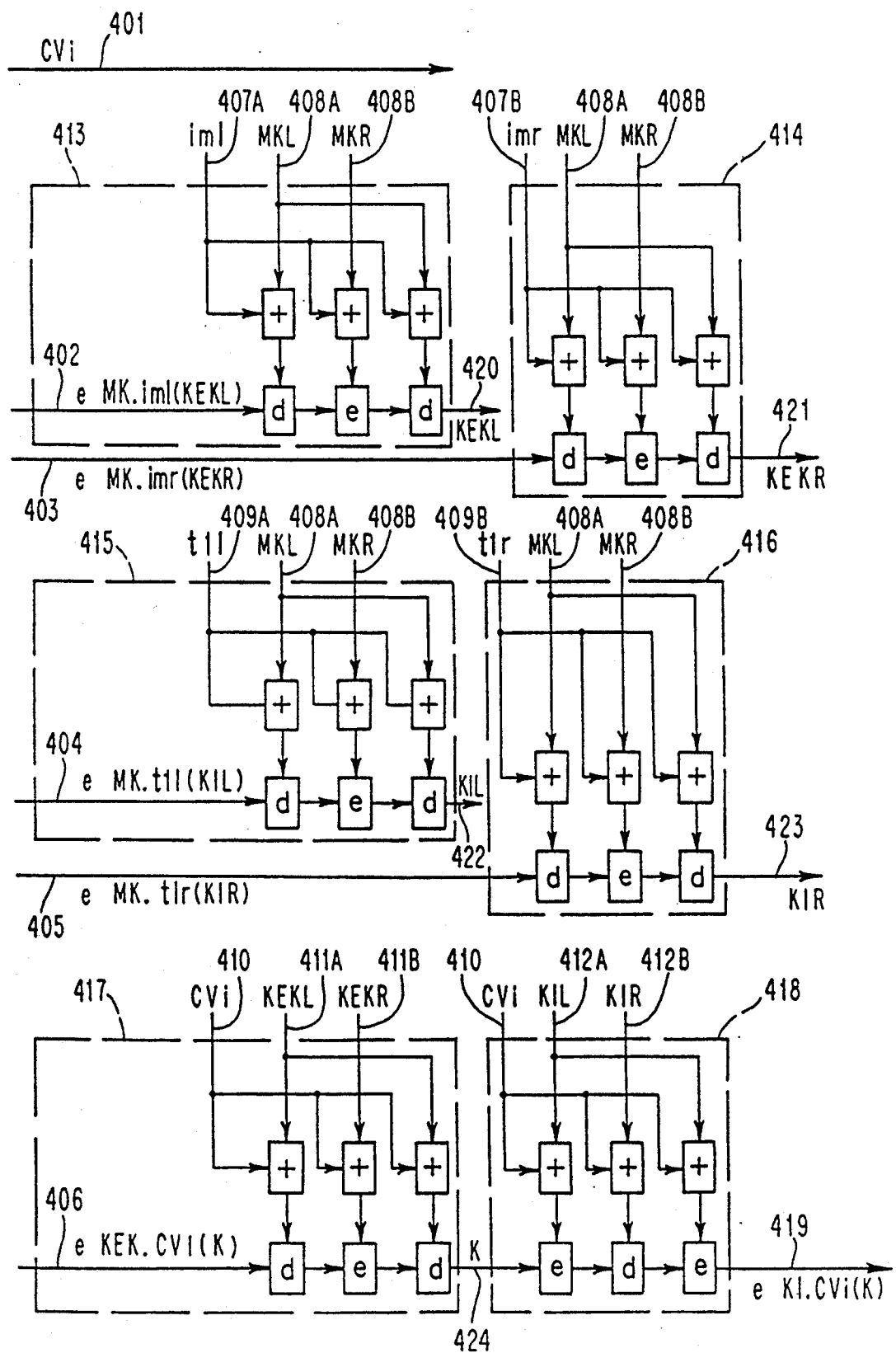
FIG. 4 is a block diagram illustrating the RFIK instruction.

FIG. 4 shows, in block diagram form, the logic for the RFIK (Reencipher From Import Key) operation. The function reenciphers a working key, K, from encrypted under a derivative of an importer, that is, $KEK.CV_1$, to become encrypted under the same derivative of another key-encrypting key, that is $KI.CV_i$. (The "e" blocks represent logical encipherment functions under the conventional DES algorithms; the "d" blocks represent logical decipherment; the "+" blocks represent Exclusive-OR operations; MKL represents the left-half of the master key; MKR represents the right half of the master key; im1 represents a control vector for the left half of an importer key; imr represents the control vector for the right half of an importer key; t1l represents a control vector for the left half of a key with type t1; t1r represents a control vector for the right half of a key with type t1; KEK is a key-encrypting key, with KEKL and KEKR being the left and right halves, respectively. KI is a key-encrypting key, with KIL and KIR being the left and right halves, respectively. This notation will be used in subsequent figures also.)

FIG. 4 shows that there are six basic inputs to the RFIK instruction ($CV_i$(401); eMK.im1 (KEKL) (402); eMK.imr(KEKR) (403); eMK.t1l(KIL) (404); eMK.t1r(KIR) (405); and $eMKK.CV_i(K)$ (406). And the output is $eKI.CV_i(K)$ (419). Six major functional blocks are shown (413, 414, 415, 416, 417, 418). The first five of which result in "clear" key internal, transitional values (420, 421, 422, 423, 424), each used in subsequent functional blocks, and the last one of which produces the instruction's final product (419).

Figure 5:
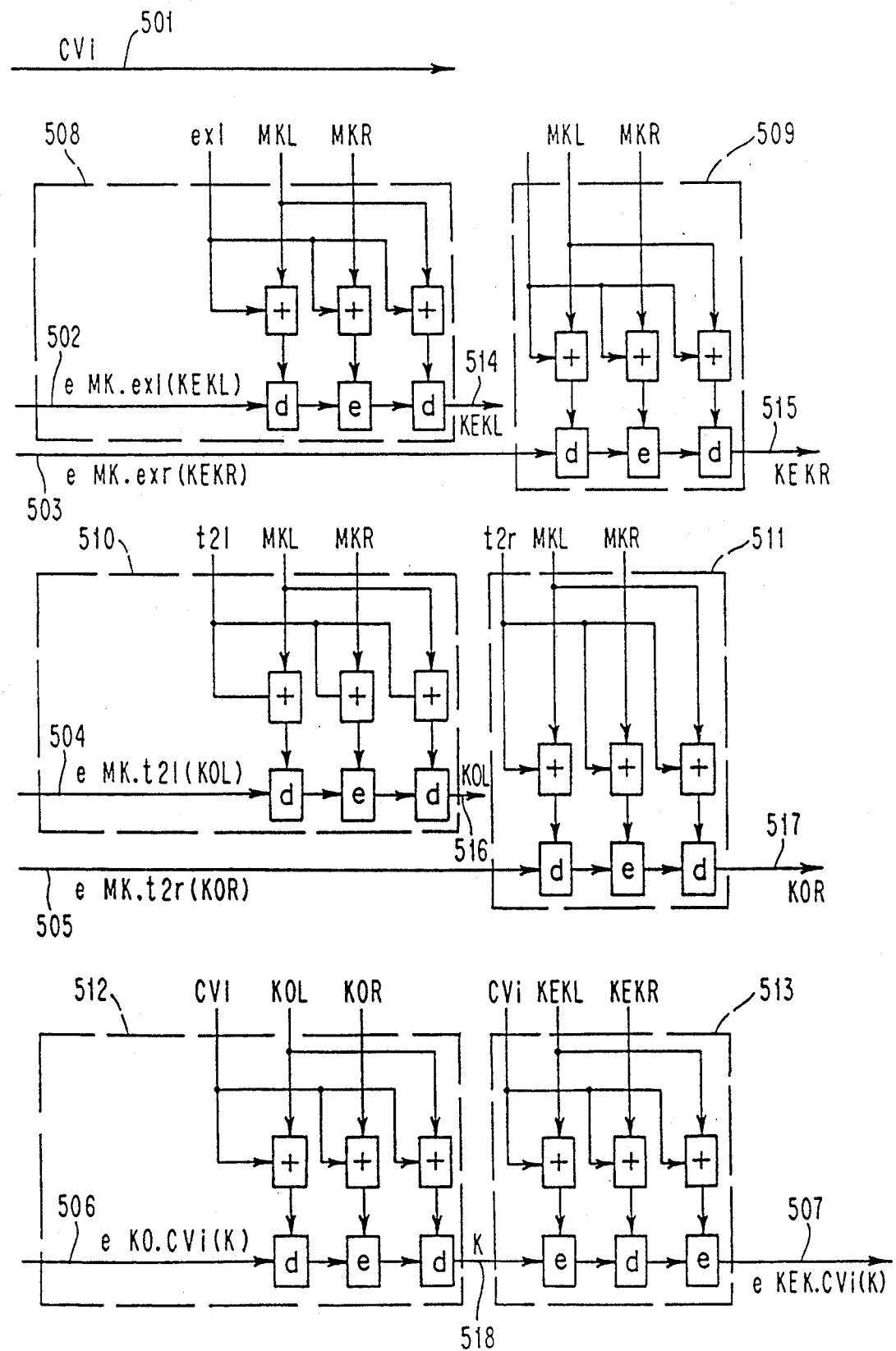
FIG. 5 is a block diagram illustrating the RTEK instruction.

FIG. 5 shows, in block diagram form, the logic for the RTEK (Reencipher to Exporter Key) operation. The function reenciphers a working key, K, from encrypted under a derivative of a key-encrypting key. That is, $KO.CV_i$, to become encrypted under the same derivative of an exporter key. That is, $KEK.CV_i$. (t2l represents a control vector for the left half of a key with type t2; t2r represents a control vector for the right half of a key with type t2. exl represents a control vector for the left half of an exporter key; exr represents a control vector for the right half of an exporter key. KO is a key-encrypting key, with KOL and KOR being the left and right halves, respectively.)

There are six inputs for RTEK: $CV_i$(501); eMK.exl (KEKL) (502); eMK.exr (KEKR) (503); eMK.t2l (KOL) (504); eMK.t2r (KOR) (505); $eKO.CV_i$ (K) (506). There is one final result: $eKEK.CV_i$ (K) (507). There are six major functional blocks (508, 509, 510, 511, 512, 513), the first five producing clear key internal results used in subsequent blocks (514, 515, 516, 517, 518), and the last one producing the instructions ultimate result (507).

Figure 6:
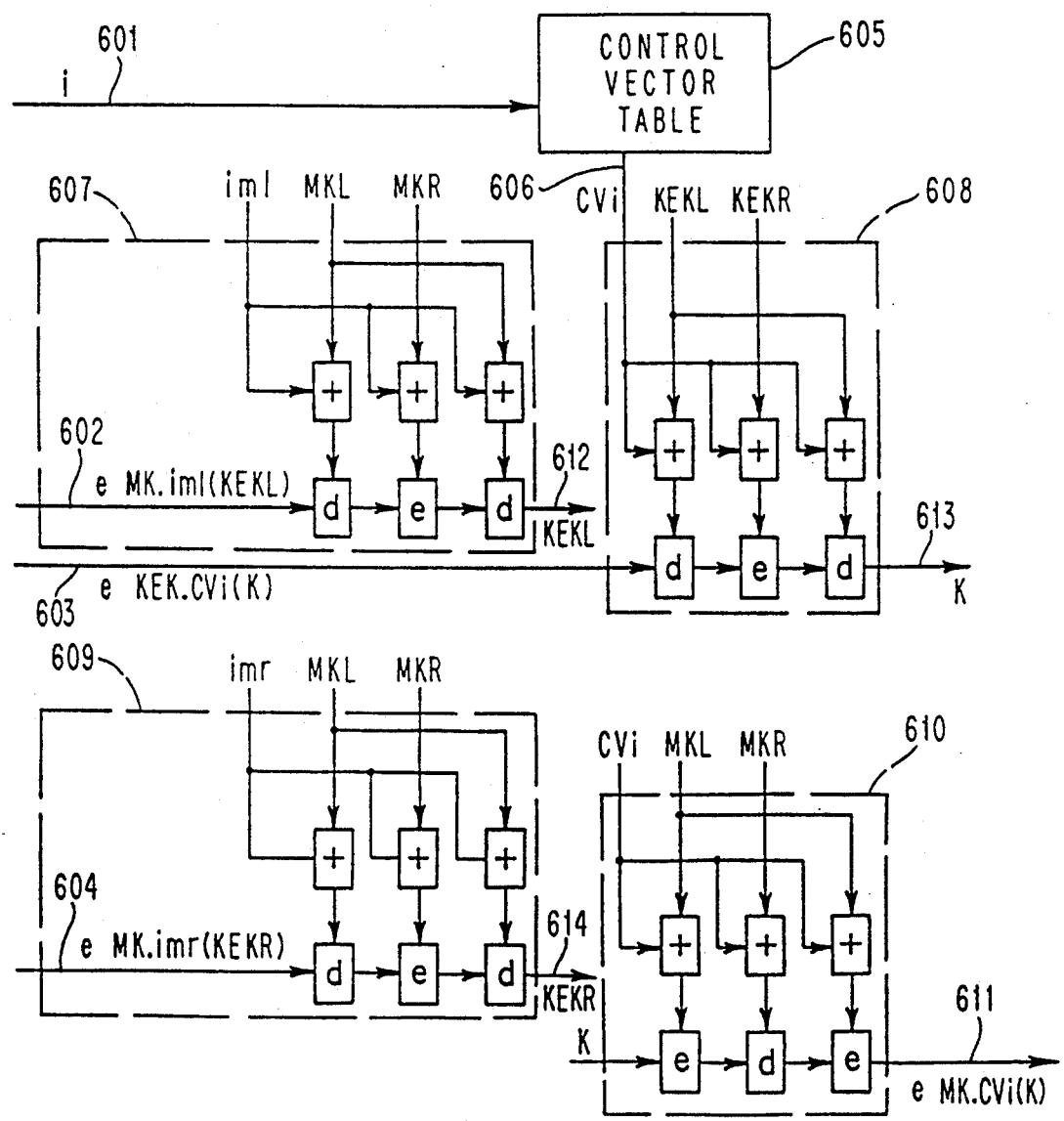
FIG. 6 is a block diagram illustrating the RTMK instruction (known in the prior art).

FIG. 6 shows, in block diagram form, the logic for the RTMK (Reencipher to Master Key) operation—known in the prior art. The function reenciphers a working key, K, from encrypted under a derivative of an importer key. That is, $KEK.CV_i$, to become encrypted under the same derivative of the master key, that is $MK.CV_i$. There are four inputs for RTMK; i (601) (the index into the Control Vector Table 605 which is used to select $CV_i$ (606)); eMK.im1 (KEKL) (602); $eKEK.CV_i$ (K) (603); eMK.imr (KEKR) (604). There is one final result: $eMK.CV_i$(K) (611) There are four major functional blocks (607, 608, 609, 610), the first three of which produce clear key internal results used in subsequent blocks (612, 613, 614), and the last of which produces the instruction's ultimate result (611).

Figure 7:
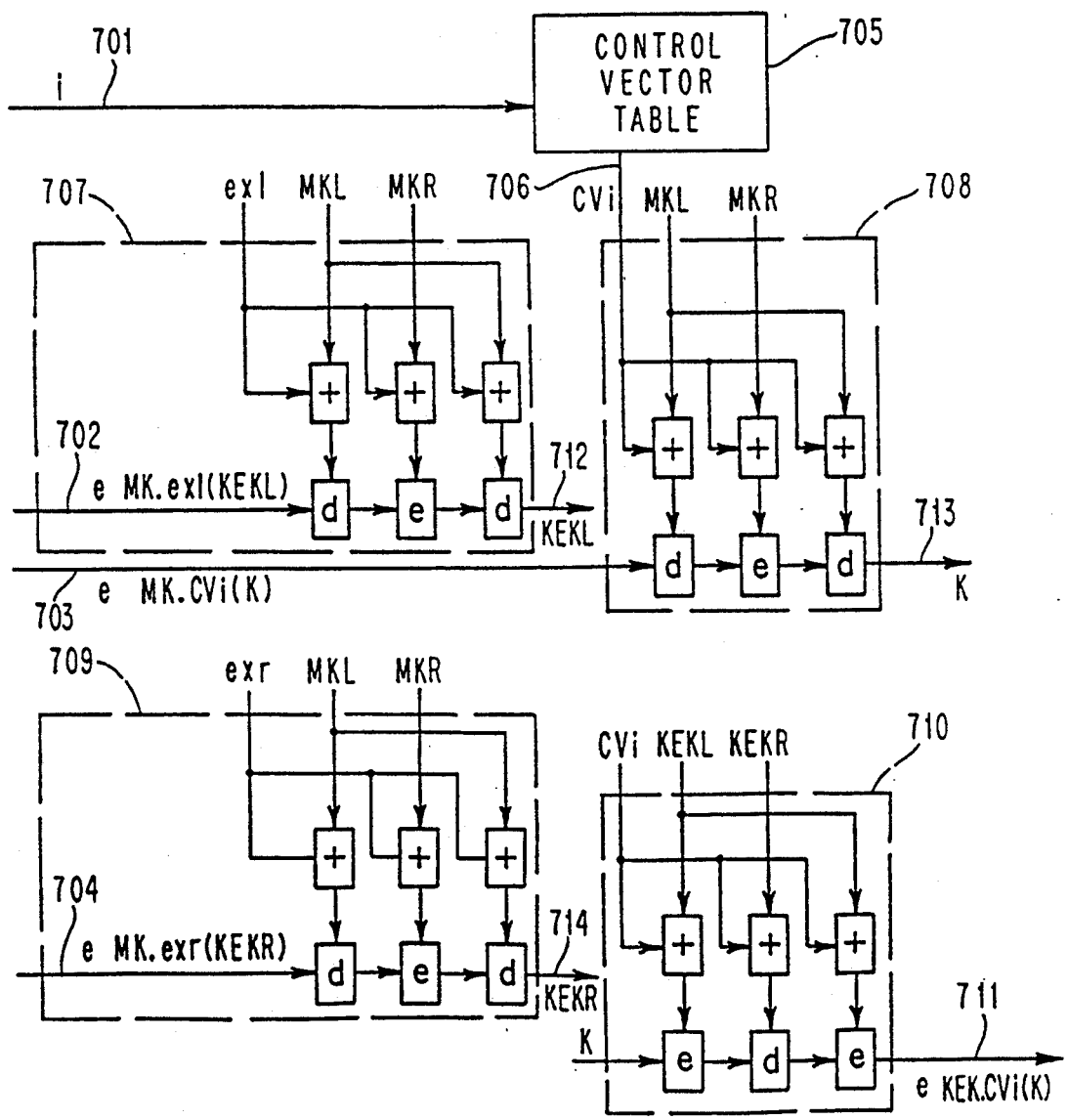
FIG. 7 is a block diagram illustrating the RFMK instruction (known in the prior art).

FIG. 7 show, in block diagram form, the logic for the RFMK (Reencipher from Master Key) operation—known in the prior art. The function reenciphers a working key, K, from encrypted under a derivative of the master key, that is $MK.CV_i$, to become encrypted under the same derivative of an exporter key, that is $KEK.CV_i$. There are four inputs for RFMK: i (701) (the index into the Control Vector Table 705 which is used to select $CV_i$ (706)); eMK.ex1 (KEKL) (702); $eMK.CV_i(K)$ (703); eMK.exr (KEKR) (704). There are four major functional blocks (707, 708, 709, 710), the first three of which produce clear key internal results used in subsequent blocks (712, 713, 714), and the last of which produces the instruction's ultimate result (711).

FIG. 8 shows, in block diagram form, the logic for the EIK (Encipher under Importer Key) operation—known in the prior art. The function encrypts a working key, K, under the specified derivative of a importer key, that is $KEK.CV_i$. There are four inputs for EIK: i (801) (the index into the Control Vector Table 805 which is used to select $CV_i$ (806)); eMK.im1 (KEKL) (802); eMK.imr (KEKR) (803); K (804). There are three major functional blocks (807, 808, 809), the first two of which product clear key internal results used in subsequent blocks (811, 812), and the last of which produces the instruction's ultimate result (810).

An alternative method to transmit keys between systems using different usage-control values, without the use of this invention, is to install a special shared KEK between the two systems, where the value of the KEK installed in one of the systems is adjusted to compensate for the difference between the usage-control values used in the two systems. The invention described herein has the following advantages over that alternative method:

1. One pair of dummy KEKs can be used for any number of different shared KEKs, whereas with the alternative, each KEK used for exchange must be installed in the special way.
2. With this invention, shared KEKs can be installed in the normal fashion. With the alternative, special procedures are required for the installation of shared KEKs.
3. With the alternative, a separate shared KEK must be installed for each type of key to be exchanged. With this invention, a single shared KEK can be used for exchanging multiple key types.
4. With the alternative, the number of shared keys and their handling differs between types of systems. These differences are difficult to handle. With this invention, the translation function can be easily done as an independent step with no effect on the other portions of the operation.

What is claimed is:

1. A method for secure translation of a working key from being enrypted using a first usage-control value and a first key-encrypting-key to being encrypted using a second usage-control value and a second key-encrypting-key, said method being performed in a data processing system including a cryptographic facility, and comprising the steps of:

(a) securely installing a generated translation control value (TCV) associated with said translation, said generated TCV being functionally related to said first usage-control value and to said second usage-control value;

(b) performing a reencipher cryptographic operation, with input comprising as a first input the working key enciphered under a first derived key based on a first key-encrypting-key, and as a second input an input TCV, and producing a translated result, said translated result being said to be correct only if said input TCV equals said generated TCV, and being another value if said input TCV does not equal said generated TCV, said translated result, when correct, being the working key enciphered under a second derived key based on said second key-encrypting-key, whereby said input TCV controls whether said translated result is correct.

2. The method of claim 1 in which the first derived key based on said first key-encrypting-key is obtained by Exclusive ORing said first key-encrypting-key with said first usage-control value, and the second derived key based on said second key-encrypting-key is obtained by Exclusive ORing said second key-encrypting-key with said second usage-control value.

3. The method of claim 1 in which the translation control value comprises a first dummy key and a second dummy key.

4. The method of claim 3 in which said first dummy key and said second dummy key are related by means of said first usage-control value and said second usage-control value.

5. The method of claim 4 in which said relationship is the Exclusive OR function.

6. The method of claim 5 in which said input further comprises as a third input said first key-encrypting-key enciphered under an importer derivative of a master key, the master key is used as said second key-encrypting-key, and said reencipher cryptographic operation comprises a reencipher from importer key step, followed by a reencipher to master key step.

7. The method of claim 5 in which said input further comprises as a third input said second key-encrypting-key enciphered under an exporter derivative of a master key, the master key is used as said first key-encrypting-key, and said reencipher cryptographic operation comprises a reencipher from master key step, followed by a reencipher to exporter key step.

8. The method of claim 5 in which said input further comprises as a third input said first key-encrypting-key enciphered under an importer derivative of a master key, and, as a fourth input, said second key-encrypting-key enciphered under an exporter derivative of the master key, and said reencipher cryptographic operation comprises a reencipher from importer key step, followed by a reencipher to exporter key step.

9. The method of claim 5 in which said input further comprises as a third input said first key-encrypting-key enciphered under an importer derivative of a master key, and, as a fourth input, said second key-encrypting-key enciphered under an importer derivative of the master key, and said reencipher cryptographic operation comprises two reencipher from importer key steps.

10. The method of claim 5 in which said input further comprises as a third input said first key-encrypting-key enciphered under an exporter derivative of a master key, and, as a fourth input, said second key-encrypted-key enciphered under an exporter derivative of the master key and said reencipher cryptographic operation comprises two reencipher to exporter key steps.

11. An apparatus for secure translation of a working key from being encrypted using a first usage-control value and a first key-encrypting-key to being encrypted using a second usage-control value and a second key-encrypting-key, said apparatus comprising:

(a) means for performing a reencipher cryptographic key operation, with input comprising as a first input a third key-encrypting-key encrypted under a key derived from a master key, as a second input a fourth key-encrypting-key encrypted under a key derived from the master key, as a third input a third usage-control value, and as a fourth input a working key enciphered under a key derived from said third usage-control value and said third key-encrypting-key, producing an output consisting of said working key encrypted under a key derived from said third usage-control value and said fourth key-encrypting-key;

(b) installation means for converting a clear key to an encrypted form to be used as either said third key-encrypting-key or said fourth key-encrypting-key.

12. The apparatus of claim 11 in which the key derived from said third key-encrypting-key is obtained by Exclusive ORing said third key-encrypting-key with said third usage-control value, and the key derived from said fourth key-encrypting-key is obtained by Exclusive ORing said fourth key-encrypting-key with said third usage-control value.

13. The apparatus of claim 11 in which said third key-encrypting-key is encrypted under an importer derivative of the master key.

14. The apparatus of claim 11 in which said third key-encrypting-key is encrypted under an exporter derivative of the master key.

15. The apparatus of claim 11 in which said fourth key-encrypting-key is encrypted under an importer derivative of the master key.

16. The apparatus of claim 11 in which said fourth key-encrypting-key is encrypted under an exporter derivative of the master key.

17. The apparatus of claim 13 further comprising a reencipher to master key function.

18. The apparatus of claim 16 further comprising a reencipher from master key function.

19. The apparatus of claim 11 in which said installation means comprises an encipher under importer key function.

20. The apparatus of claim 11 in which said installation means comprises manual key entry functions.

21. An apparatus for secure translation of a working key from a first encrypted form to a second encrypted form, said first encrypted form being said working key encrypted using a first usage-control value and a first key-encrypting-key, said second encrypted form being said working key encrypted using a second usage-control value and a second key-encrypting-key, said apparatus comprising:

(a) installation means for combining and encrypting said first usage-control value and said second usage-control value to produce a generated translation control value (TCV);

(b) means for performing a reencipher cryptographic key operation, with input comprising an input TCV and said first encrypted form of said working key, said means for performing further comprising:
  1. means for deriving a third usage-control value and a fourth usage-control value from said TCV;
  2. means for deciphering said first encrypted form of said working key using said third usage-control value and said first key-encrypting-key;

3. means said working key using said fourth usage-control value and said second key-encrypting-key and producing a translated result, said translated result being said to be correct only if said input TCV equals said generated TCV, and being another value if said input TCV does not equal said generated TCV, said translated result, when correct, being said second encrypted form of said working key, whereby said input TCV controls whether said translated result is correct.

22. A method for secure translation of a working key from being encrypted using a first usage-control value and a first key-encrypting-key to being encrypted using a second usage-control value (UCV) and a second key-encrypting-key, said method being performed in a data processing system including a cryptographic facility, and comprising the steps of:
   (a) securely installing a generated translation control value (TCV) associated with said translation, said generated TCV being functionally related to said first usage-control value and to said second usage-control value;
   (b) performing a reencipher cryptographic operation, with input comprising as a first input the working key enciphered under a first derived key based on a first key-encrypting-key, and as a second input an input TCV, and producing a translated result, said translated result being said to be correct only if said input TCV equals said generated TCV, and being another value if said input TCV does not equal said generated TCV, said translated result, when correct, being the working key enciphered under a second derived key based on said second key-encrypting-key, said producing of said translated result not being conditioned on a TCV or a UCV check, whereby said input TCV controls whether said translated result is correct.

23. An apparatus for secure translation of a working key from a fist encrypted form to a second encrypted form, said first encrypted form being said working key encrypted using a first usage-control value (UCV) and a first key-encrypting-key, said second encrypted form being said working key encrypted using a second usage-control value and a second key-encrypting-key, said apparatus comprising:
   (a) installation means for combining and encrypting said first usage-control value and said second usage-control value to produce a generated translation control value (TCV);
   (b) means for performing a reencipher cryptographic key operation without conditioning said operation on UCV or TCV checking, with input comprising an input TCV and said first encrypted form of said working key, said means for performing further comprising:
      1. means for deriving a third usage-control value and a fourth usage-control value from said TCV;
      2. means for deciphering said first encrypted form of said working key using said third usage-control value and said first key-encrypting-key;
      3. means for enciphering said working key using said fourth usage-control value and said second key-encrypting-key and producing a translated result, said translated result being said to be correct only if said input TCV equals said generated TCV, and being another value if said input TCV does nto equal said generated TCV, said translated result, when correct, being said second encrypted form of said working key, whereby said input TCV controls whether said translated result is correct.

* * * * *

UNITED STATES PATENT AND TRADEMARK OFFICE
CERTIFICATE OF CORRECTION

PATENT NO. : 5,177,791
DATED : Jan. 5, 1993
INVENTOR(S) : Yeh, et al.

It is certified that error appears in the above-identified patent and that said Letters Patent is hereby corrected as shown below:

Claim 21, column 11, line 1, after "means" and before "said" insert -- for enciphering --.

Signed and Sealed this

Fourteenth Day of June, 1994

Attest:

*Attesting Officer*

BRUCE LEHMAN

*Commissioner of Patents and Trademarks*